United States Patent [19]

Necas et al.

[11] 4,387,860
[45] Jun. 14, 1983

[54] FOOD PROCESSOR

[75] Inventors: Donald E. Necas, Lincoln Township, Berrien County; Aman U. Khan, Stevensville, both of Mich.

[73] Assignee: Whirlpool Corporation, Benton Harbor, Mich.

[21] Appl. No.: 203,712

[22] Filed: Nov. 3, 1980

[51] Int. Cl.³ .................... B02C 18/10; B02C 18/18
[52] U.S. Cl. .............................. 241/282.1; 241/285 R
[58] Field of Search ............. 241/37.5, 282.1, 282.2, 241/285 R, 285 A, 285 B

[56] References Cited

U.S. PATENT DOCUMENTS

| | | |
|---|---|---|
| D. 137,946 | 5/1944 | Doner . |
| 2,249,972 | 7/1941 | Meyer .................. 241/37.5 X |
| 2,352,232 | 6/1944 | Strauss .................. 241/37.5 |
| 2,462,089 | 2/1949 | Frisbie . |
| 3,224,743 | 12/1965 | Freedman . |

Primary Examiner—Howard N. Goldberg
Attorney, Agent, or Firm—Wood, Dalton, Phillips, Mason & Rowe

[57] ABSTRACT

A multipurpose culinary food processor having a support with a movably carried arm which is recessed in a base portion of the support in a retracted position and which extends in cantilevered fashion outwardly therefrom in use of the processor. The arm is arranged to carry the mixing bowl and the food processor blade device. The bowl is suspended from the arm with the drive being connected to the food treating device rotatably carried in the bowl. When used as a food processor, the cutting blades are provided in a carrier which is suspended from the arm. The carrier includes an integral chute and the cut food is delivered to a subjacent collecting space therefrom. The arm is swingably mounted to the base for movement about a vertical axis between the retracted and extended positions. In the retracted position, the arm is flush with the base housing. In one form, the food processor is mounted in a floor-mounted cabinet and selectively positioned in a retracted position within the cabinet and in an extended position wherein a portion of the support extends in underlying relationship to the arm in the operating disposition.

5 Claims, 18 Drawing Figures

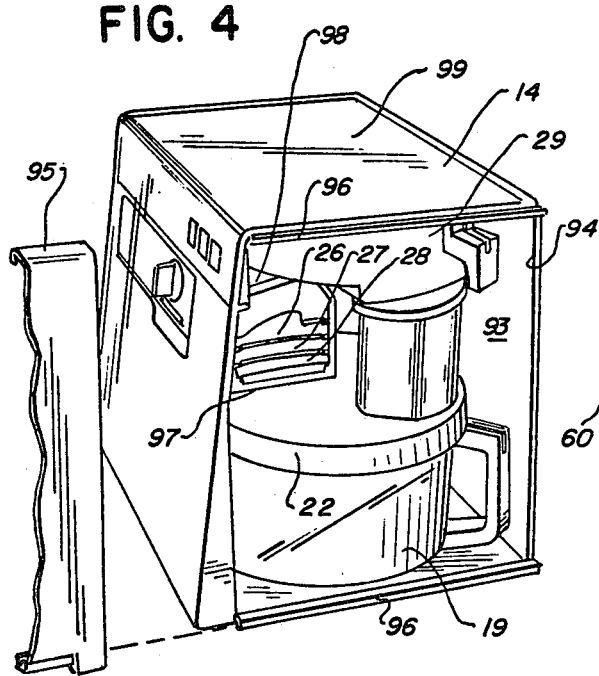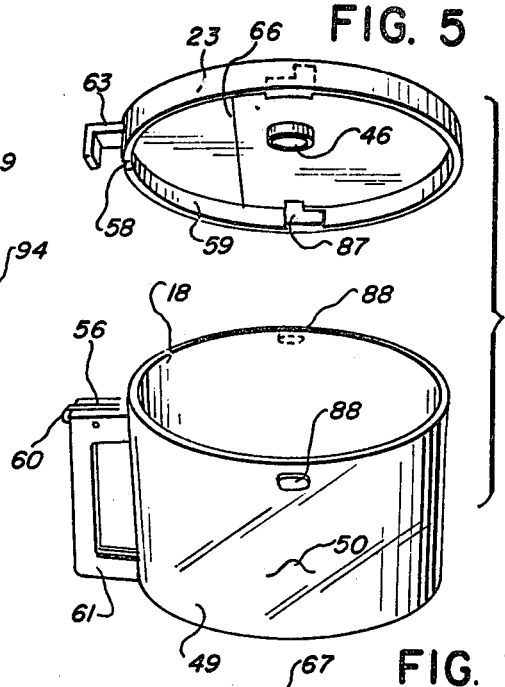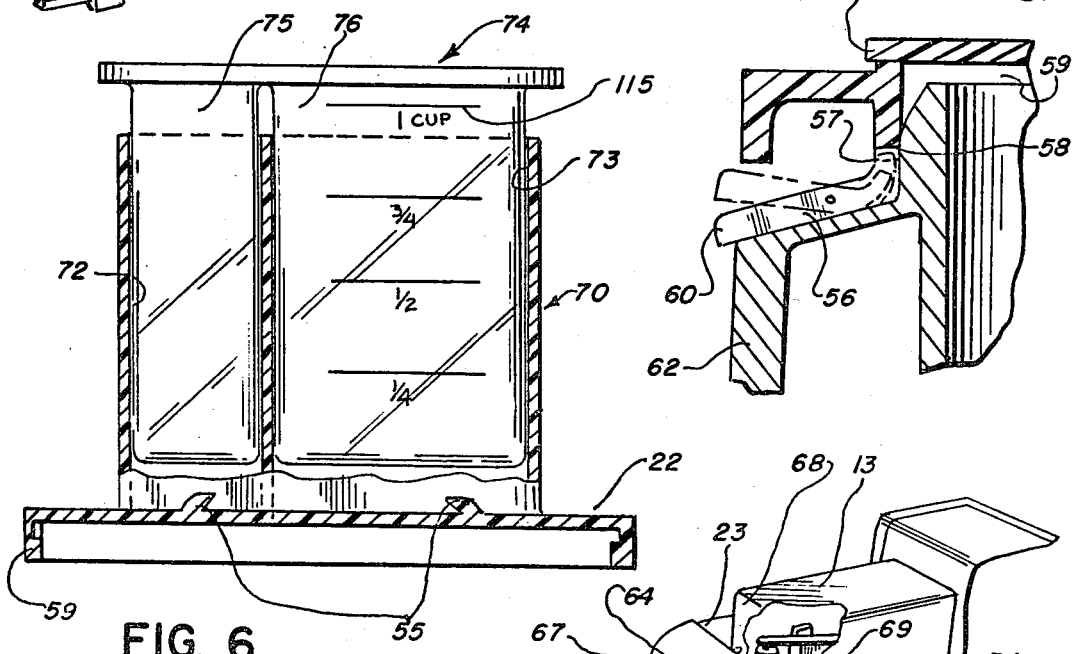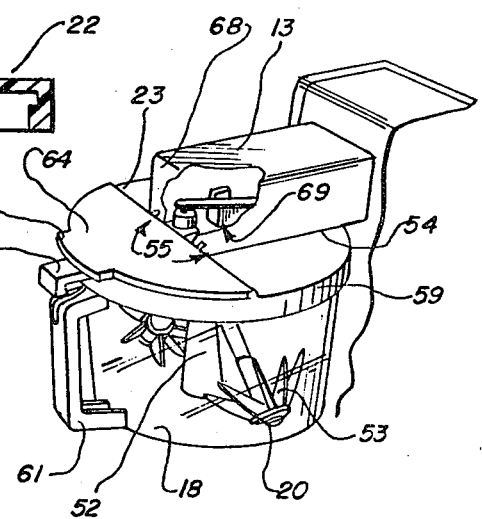

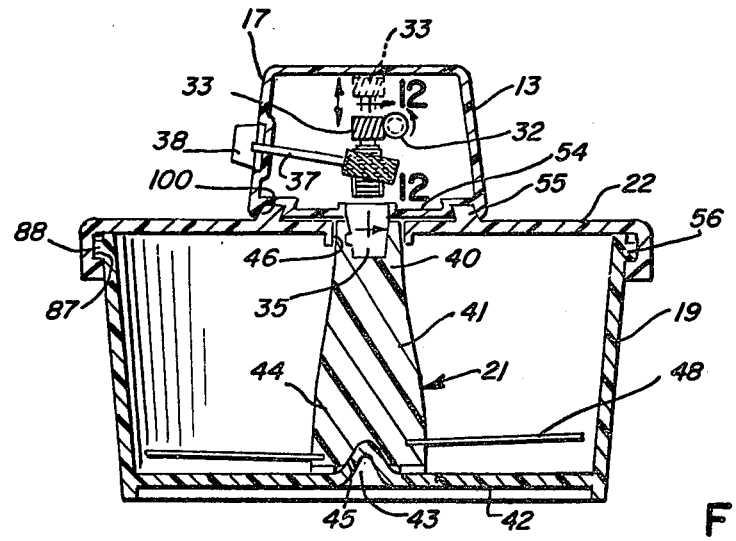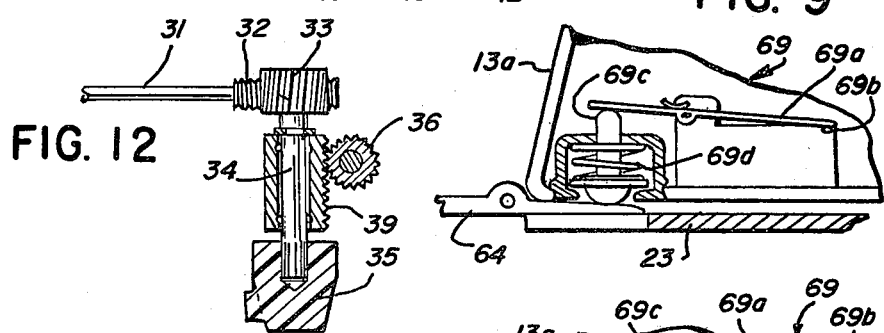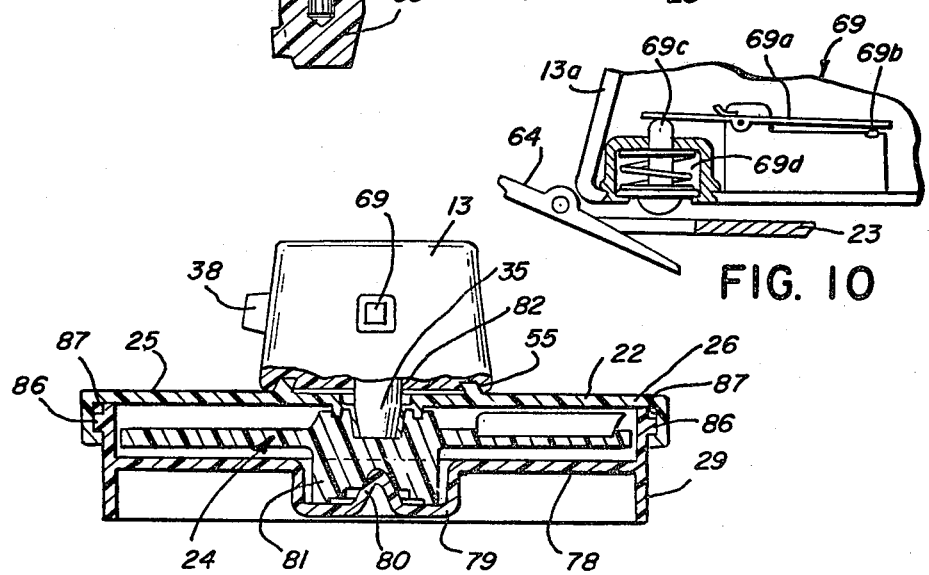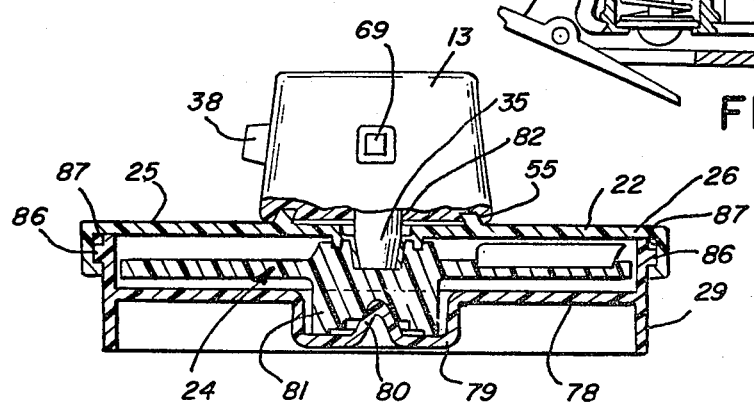

FOOD PROCESSOR

CROSS-REFERENCE TO RELATED APPLICATIONS

In copending application of Donald E. Necas, Ser. No. D-203,711, filed Nov. 3, 1980, entitled Design for a Food Processor, and issued on Aug. 10, 1982, as U.S. Pat. No. DES. 265,716 the new and ornamental design of the countertop food processor is disclosed and claimed. In copending application Ser. No. 203,710, filed Nov. 3, 1980, entitled Food Processor, a number of the inventions embodied in the food processor disclosed herein but made by the individual inventor, Donald E. Necas, are disclosed and claimed.

BACKGROUND OF THE INVENTION

1. Field of the Invention

This invention relates to food processors and food blenders and mixers.

2. Description of the Background Art

In the background art, it has been conventional to provide food mixers and blenders wherein a mixing receptacle is carried on a base structure and includes drive means extending through a bottom wall thereof which are rotated by a drive carried in the base structure so as to drive a processing blade mounted on the upper end of the connector so as to process food placed in the receptacle. One example of such a structure is shown in FIGS. 3, 4, and 5 of U.S. Pat. No. 3,385,117 of Artur K. H. Braun.

As illustrated in FIGS. 6 and 7 of the Braun patent, another prior art structure for use in preparing foods comprises a grinder which is mounted on an upright portion of the support so as to deliver ground food products into a subjacent bowl.

Still another form of prior art structure for use in preparing food products is illustrated in FIGS. 8 and 9 of the Braun patent wherein a conventional mixer is provided with depending mixer blades received in a bowl carried on a base portion of the support.

More recently, a food comminution device for chopping, shredding, sectioning and similarly cutting foodstuffs, such as meat, vegetables, and the like, has been developed, as illustrated in U.S. Pat. No. 3,809,325 of Paul Marrie. As shown in that patent, the food chopper has a power base from which a drive shaft extends upwardly. A replaceable cutting unit is disposed above the base and is provided with different levels for cutting the foodstuffs and ejecting the cut products centrifugally. A cover providing a vertical delivery chute is supported on the cutting unit and includes a safety switch preventing operation of the cutting unit when the cover is removed. This latter device is generally referred to as a food processor in contradistinction to the earlier devices which are normally referred to as food mixing and food blending devices.

A large number of different food mixing, food blending, and food processing devices have been developed in the background art. Illustratively, Hulbert C. Doner discloses, in U.S. patent Nos. Des. 137,946, a food mixer wherein the bowl is received in the base portion of the housing with a cover enclosing the entire assembly in a closed arrangement of the mixer.

In U.S. Pat. No. Des. 195,424, Douglas N. Cabell et al show a food mixer wherein the arm carrying the mixing blades is pivotable about a horizontal axis from a horizontal operative position to an upright retracted position wherein the arm projects upwardly from the base support. In an alternative retracted position, the arm is recessed within the base support to extend downwardly from the horizontal pivot.

In U.S. Pat. No. 1,158,198 of Edwin Franke, a vegetable mashing machine is shown wherein rotary chopping and cutting devices and rotary comminuting and mashing devices are selectively mounted on a shaft 15 so as to process or treat food products in a food containing vessel carried on a subjacent arm.

Charles L. Laemmel shows, in U.S. Pat. No. 1,690,904, a meat chopper having a spiral meat advancing means advancing the meat product to a knife at the front of the cylinder. Thus, the Laemmel device is generally similar to the grinder device shown in FIG. 6 of the Braun patent discussed above.

Theron H. Walker discloses in U.S. Pat. No. 2,460,663, a reciprocating grater with removable tool plates which is carried on a stand.

Marshall H. Frisbie shows, in U.S. Pat. No. 2,462,089, a culinary appliance arranged to be stored within a cabinet and including a mixer blade carried on an arm which pivots about a horizontal axis in the manner of the Cabell et al design patent discussed above. The mixer bowl is carried on a subjacent panel extended out from the cabinet in the operating arrangement of the device.

Frieda S. Franke shows a bowl cover attachment for electric food mixers in U.S. Pat. No. 2,517,648 wherein the cover is provided as a pair of hingedly connected semicircular portions through one portion of which is extended the beater shafts so as to permit covering the open top of a bowl to prevent splattering during the mixing of fluids and to prevent the escape of dust when mixing dry materials in the bowl.

Raoul A. Lambert shows a food mixer apparatus in U.S. Pat. No. 2,943,846 wherein the elements of the apparatus are stored in a storage case.

Murray Ireland et al show, in U.S. Pat. No. 3,170,674, a household mixer which is removably mounted on a stand permitting the mixer head to be used with the stand or as a portable mixer head, as desired. The head is provided with means for removably connecting the mixer beaters which extend downwardly into the mixing bowl which may be carried on a support on the base of the stand.

In U.S. Pat. No. 3,224,743, Lawrence I. Freedman et al show a multipurpose domestic appliance corresponding to that of the Cabell et al design patent, U.S. Pat. No. Des. 195,424 discussed above.

George A. Westergren et al disclose, in U.S. Pat. No. 3,778,863, owned by the assignee hereof, a vacuum cleaner implement tray wherein the various implements of the vacuum cleaner are stored on a tray within the canister portion of the vacuum cleaner structure.

Pierre Verdun discloses, in U.S. Pat. No. 3,892,365, a food processor having a bowl detachably mounted on top of a drive casing. The apparatus includes rotary blades, a perforate basket, and rasping and cutting discs for cutting, blending, grating, grinding, chopping, mixing whipping, and otherwise processing food materials.

In U.S. Pat. No. 4,095,751, Robert L. Artin discloses a slicing and shredding apparatus of the food processor type having slicing or shredding discs provided with raised blades with an adjacent slot through which the sliced material passes. A plurality of the spaced discs is provided so as to slice the food into thicknesses directly related to the spacing. The structure is arranged so that the drive motor may be energized when the cover to the receptacle is not in position, but the cutting discs will not rotate until the cover displaces the drive coupling downwardly to complete the drive connection to the cutting tool.

A food grinder is shown in U.S. Pat. No. 4,138,066 of Keith M. Mullins et at wherein the grinder has an upstanding base unit with a worm driven gear linkage connected to a cassette received in a receptacle in one side of the base unit. The cassette includes an upright removable food grinding mechanism.

Tadahiko Shiotani shows a food processor, in U.S. Pat. No. 4,143,824, wherein the blades are removably fastened to a shaft extending upwardly from a subjacent drive into the lower portion of the container with the bottom surface of the container being frustoconical. The blades are similarly frustoconical and food is delivered downwardly into the container through a chute on the cover portion thereof.

A holder for storing tools of a food processing machine is disclosed in U.S. Pat. No. 4,146,131 of Paul R. Hoffman et al. The holder includes a plurality of panels with spaces therebetween to accommodate the active elements of the tools, with the stem portion of the tools extending outwardly through slots in one of the panels.

In U.S. Pat. No. 4,153,210, Robert L. Schaeffer shows a food processor which includes a removable reducing transmission which forms and closes the bottom wall of the bowl. The transmission includes a portion extending into the bowl for supporting the cutting mechanism from the bottom thereof.

SUMMARY OF THE INVENTION

The present invention comprehends an improved multi-purpose culinary food processor having means for food processing, food blending and food mixing.

More specifically, the invention comprehends the provision of an improved multipurpose culinary food processor wherein a bowl for containing food to be processed is mounted to a cntailevered arm containing the drive means for driving the food processing means.

The arm defines the sole support of the bowl and the processing means during the food processing operation.

The support may include a base portion from which the arm is cantilevered.

The food processing elements are removably connected to the drive mechanism so as to be received within the bowl when the food processor is used for mixing and blending purposes.

The invention further comprehends the provision of a housing for processing elements, such as cutter blades and the like which is removably connected to the arm with the processing element rotatably carried therein.

The housing may be provided with a chute for guiding food to be processed downwardly therethrough into engagement with the processing element.

The housing may be provided with a lower discharge opening aligned with the chute so as to pass the processed food downwardly as to subjacent bowl which may be carried on a subjacent support surface.

The support arm may be swingably mounted to the base of the support so as to swing about a vertical axis.

The arm swings from a retracted position which, illustratively, may be within a recess in the base portion of the support, to an outwardly extending operative position.

In the retracted position, the arm may be flush with the outer wall of the base.

In one form, the base is adapted to rest on a horizontal support surface, such as a countertop.

In another form, the base comprises a floor-mounted cabinet. The cabinet may be free standing, or may be a portion of a counter, as desired.

The support is movably mounted on the cabinet for selective disposition in a retracted arrangement within the cabinet, and in an operative arrangement extending from the cabinet.

When arranged in the operative position, a portion of the support may be spaced below the drive means arm, such as for supporting a bowl or the like.

The cabinet may be provided with an upwardly facing work surface, such as a cutting board surface, forwardly of the food processor.

The cabinet may be provided with suitable means for storing the processor elements, the bowl, the processor housing, etc.

The bowl may be secured removably to the support arm by suitable interlocking slide means.

In the illustrated embodiment, the bowl includes a cover portion which is removably secured to the arm and the bowl and cover portion include interlocking means for removably supporting the bowl to the cover portion.

In one form, the cover portion includes a hinged portion removably closing an access opening through the cover to permit passage of food to be processed in the bowl downwardly through the access opening.

In another form, the cover is provided with a chute.

The mixing and blending means utilized with the bowl may be selectively rotatably supported on the bowl so as to have driven engagement with the drive means carried by the support arm.

More specifically, the invention comprehends, in broad aspect, a multipurpose culinary food processor including a support having a downwardly extending drive means, a bowl for containing food to be processed, food processing means rotatably carried by the bowl and having means for releasable connection thereof to the drive means, and mounting means for removably mounting the bowl to the support with the processing means in driven engagement with the drive means, the support defining the sole support of the bowl and processing means during a food processing operation.

Further more specifically, the food processor may include a support, a drive mechanism carried by the support and having a downwardly extending output drive member, food processing means having a plurality of food processing elements including at least one cutter blade disc, and means for selectively drivingly connecting the elements to the drive mechanism output drive member below the support for processing food moved downwardly against the driven food processing element connected to the output drive member.

Further more specifically the food processor may include a housing defining an outwardly opening recess, a drive mechanism, food processing means, means for removably connecting the processing means to the drive mechanism, and means for selectively positioning the drive mechanism in a retracted inoperative disposition within the recess separately of the processing means, and in an operative disposition extending from the housing with the processing means removably installed thereon. In the illustrated embodiment, the positioning means comprises means for mounting the drive mechanism to swing about a vertical axis between the retracted and operative dispositions.

Still more specifically, the food processor includes a support having a downwardly extending drive means, a bowl for containing food to be processed, food processing means rotatably carried by the bowl and having means for rleasable connection thereof to the drive means, mounting means for removably mounting the bowl to the support with the processing means in driven engagement with the drive means, the support defining the sole support of the bowl and processing means during a food processing operation, a floor mounted cabinet, and means for mounting the support movably on the cabinet for selective disposition in a retracted arrangement in the cabinet and in an operative position extending from the cabinet for supporting the bowl in spaced relationship to the cabinet.

The food processor further more specifically may include a support defining a subjacent processing space, rotary drive means on the support extending downwardly toward the space, a first cover defining a food guide chute and a drive opening, a second cover defining a first opening provided with a selectively positionable closure, and a second, drive opening, cooperating mounting means on the support and covers for selectively removably mounting the covers to the support with the drive means aligned with the drive opening thereof, a bowl, cooperating mounting means on the covers and bowl for selectively removably mounting the bowl to the cover mounted to the support, mixing means for mixing food in the bowl, blending means for blending food in the bowl, and means for selectively rotatably supporting the mixing means and the blending means in the bowl in driven engagement with the drive means.

The food processor structure, more specifically, may include a cutting blade, means defining a guide for passing food to be cut downwardly therethrough to a subjacent cutting space, means for rotating the cutting blade in the space about a vertical axis to cut food passed downwardly thereto from the guide, and means for passing the cut food downwardly from the cutting space.

Thus, the food processor/food mixer/food blender of the present invention is extremely simple and economical of construction while yet providing the highly desirable features discussed above. The construction permits for facilitated cleaning and permits large capacity of the system.

BRIEF DESCRIPTION OF THE DRAWING

Other features and advantages of the invention will be apparent from the following description taken in connection with the accompanying drawing wherein:

FIG. 4 is a perspective view illustrating the provision of an access opening in one end of the support base, permitting storage of the components of the food processor within the base upon removal of a closure wall illustrated fragmentarily therein;

FIG. 5 is a perspective view of a bowl for use in the food processor embodying the invention;

FIG. 6 is a vertical section of the processor housing illustrated in FIG. 3;

FIG. 7 is a fragmentary vertical section taken substantially along the line 7—7 of FIG. 2 illustrating the interlock between the bowl and cover preventing relative rotation therebetween;

FIG. 8 is a perspective view illustrating the use of the processor as a mixer, with the bowl and cover of FIG. 5 mounted to the support arm, and with a front wall portion removed to show details of a safety switch arrangement for the food processor of the present invention;

FIG. 9 is a fragmentary enlarged vertical section illustrating further details of the safety switch arrangement;

FIG. 10 is a fragmentary enlarged vertical section also illustrating further details of the safety switch arrangement;

FIG. 11 is a fragmentary enlarged vertical section taken substantially along the line 11—11 of FIG. 2;

FIG. 12 is a fragmentary enlarged vertical section taken substantially along the line 12—12 of FIG. 11;

FIG. 13 is a fragmentary vertical section taken substantially along the line 13—13 of FIG. 3;

SUMMARY OF THE INVENTION

Figure 1:
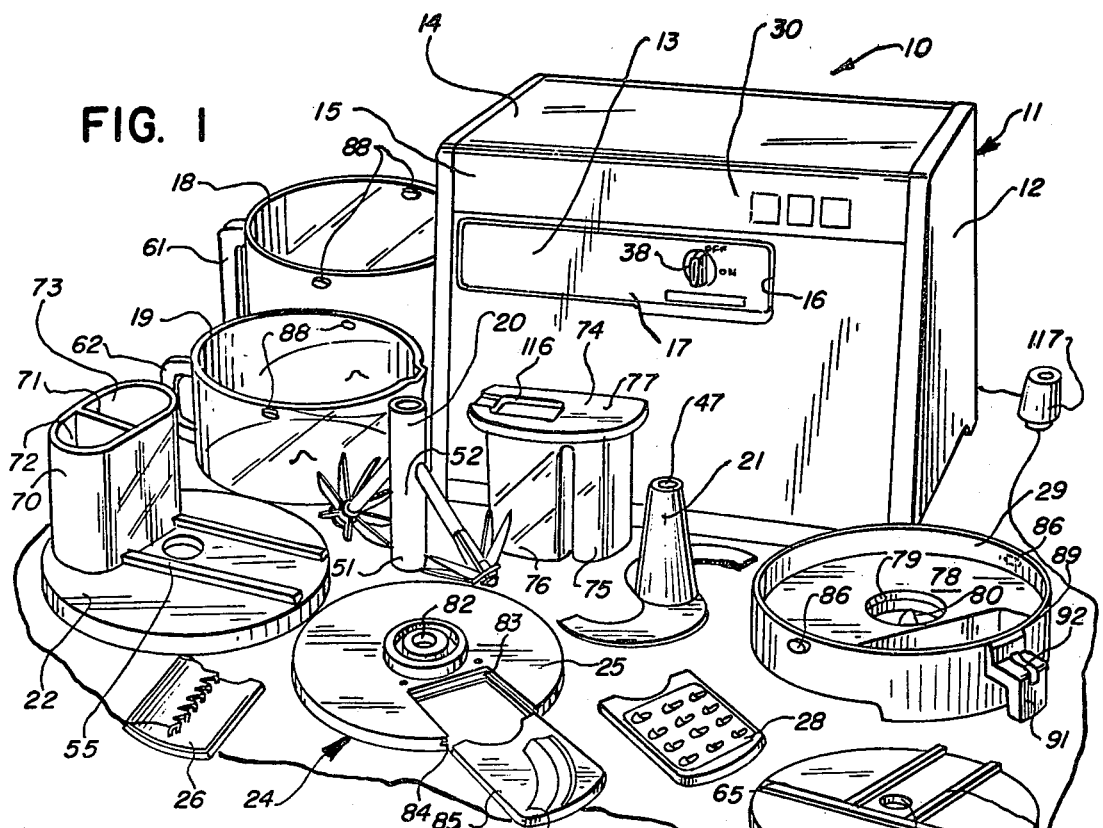
FIG. 1 is a perspective view illustrating the components of the multipurpose culinary food processor system embodying the invention.

In the exemplary embodiment of the invention as disclosed in the drawing, a multipurpose culinary food processor generally designated 10 is shown to comprise, in FIG. 1, a system for selectively mixing, blending, or processing food as desired by the user. In the embodiment of FIG. 1, the food processor apparatus includes a countertop food processor unit 11 defined by a base 12 and a support arm 13.

As shown in FIG. 1, the base 12 is defined by a housing 14 having a front wall 15 provided with a recess 16 in which the support arm 13 is recessed in a retracted position wherein a front surface 17 of the support arm 13 is flush with the wall 15.

As further shown in FIG. 1, the multipurpose food processor apparatus further includes a mixing bowl 18, a blending bowl 19, a mixing element 20, a blender-cutter element 21, a first cover 22 for bowls 18 and 19, and a second cover 23 for the bowls.

Apparatus 10 further includes a food processing blade device 24 including a mounting disc 25 and a plurality of removable cutter blades 26, 27 and 28. The processor element 24 is adapted to be rotatably mounted in a processor housing 29 for use with the cover 22, as will be described in greater detail hereinfollowing.

Front wall 15 of the base housing 14 may be provided with suitable manually operable controls 30 and 38 for controlling operation of a conventional drive motor (not shown) mounted within the housing 14. The drive motor drives a shaft 31 (FIG. 12) extending longitudinally of the support arm 13 and provided at its distal end with a worm gear 32 engaging a worm gear 33 carried on the upper end of a vertically extending drive shaft 34 and provided at its lower end with a connector 35. The shaft 34 is vertically positioned by a pinion 36 connected to a control shaft 37 (FIG. 11) extending outwardly through front surface 17 of the control arm and provided at its outer end with a control knob 38. A mating rack 39 on shaft 34 is engaged by the pinion 36 so as to selectively lower and raise the shaft 34 as a function of the rotation of control knob 38 between "off" and "on" positions illustrated in FIG. 1. As shown in FIG. 11 in dotted lines, the gear 33 in the "off" position is elevated with the gear 32, thereby effectively positively disconnecting the drive from connector 35.

As further illustrated in FIG. 11, connector 35 is adapted to frictionally engage the upper end 40 of a post 41 of cutter element 21. As shown in FIG. 1, the mixing element 20 and the cutter element 21 are adapted for use with the short bowl 19. As shown in FIG. 11, the bottom wall 42 of bowl 19 is provided at its center with an upstanding bearing portion 43. The lower end 44 of post 41 is provided with a complementary recess 45 receiving the bearing projection 43 and rotatably centering the post on the bottom wall. As further shown in FIG. 11, cover 23 is provided with a central opening 46 receiving the upper end 40 of post 41 for engagement of the connector 35 in an upwardly opening recess 47 therein. As further shown in FIG. 11, the cutter element 40 is provided with cutter blades 48 which are spaced closely above bottom wall 42 for cutting food passed downwardly into the bowl in the operation of the food processor.

As shown in FIG. 5, the bottom wall 49 of mixing bowl 18 is provided with a similar upwardly projecting bearing portion 50 for rotatably receiving the lower end 51 of the center post portion 52 of mixing element 20. As best seen in FIG. 8, the mixing element includes a pair of rotatable mixer blades 53.

As illustrated in each of FIGS. 2, 3, 8 and 11, the covers 22 and 23 are mounted to the bottom wall 54 of the drive arm 13 by cooperating slide rail means 55 on the covers and bottom wall, respectively. The covers are provided with L-shaped slots 87 (FIG. 5) adapted to receive diametrically oppositely projecting tangs 88 on the bowls for releasably locking the bowls to the covers as desired. Thus, effectively the bowls are secured to and supported by the support arm 13 in carrying out the food processing operations. To lock the bowls to the covers against inadvertent separation during use in the processing operation, the bowls are provided with latches 56, which are gravity biased so as to cause an upward projecting end 57 to be received in a slot 58 in the downturned peripheral flange 59 of the cover further defining the slots 87, as seen in FIG. 5. Thus, when the bowl is mounted to the cover with the tangs 88 rotated to the locked position, the latch 56 is aligned with the slot 58 and end 57 projects upwardly thereinto so as to prevent reverse rotation of the cover relative to the bowl, thus maintaining the bowl in connected association with the cover. When it is desired to remove the bowl from the cover, the user merely lifts up on the projecting portion 60 of the latch 56 to disengage the end 57 of the latch from the slot 58, thereby permitting reverse rotation between the cover and bowl for facilitated separation thereof as desired.

As seen in FIG. 1, bowl 18 is further provided with a carrying handle 61 and bowl 19 is provided with a similar carrying handle 62 for facilitated movement of the bowls as desired. Cover 23 may be provided with a handle 63, as shown in FIGS. 1 and 8.

As further shown in FIG. 1, cover 23 includes a closure portion 64 which is movably connected to the cover by a hinge 65 to permit passing food downwardly through the cover through an access opening 66 at the front of the cover. As shown in FIG. 8, the closure is provided with a projecting handle portion 67 for facilitating swinging movement of the closure between a closed position (shown in full lines in FIG. 2) and an open position (shown in broken lines in FIG. 2).

The food processor of the present invention is provided with a safety switch 69 for positively and instantaneously shutting off power to the drive motor when the lid or closure 64 of the mixing bowl 18 is opened, and for reactivating power to the drive motor when the lid is closed. Details of the safety switch arrangement are shown in FIGS. 8, 9 and 10. In FIG. 8 the end wall 13a of support arm 13 is partially removed to show the location and certain details of the safety switch 69. The switch 69 includes a spring-biased switch contact 69a, a fixed contact 69b, and a spring loaded plunger 69c. When closure 64 is closed, plunger 69c bears against one end of pivotally mounted switch contact 69a and causes its other end to engage fixed switch contact 69b, completing a conventional electrical circuit (not shown) for the drive motor.

However, if the lid is opened, the tail end of the closure 64 moves away from the head of plunger 69c and a spring 69d encircling the plunger urges the plunger 69c to move downward, as shown in FIGS. 9 and 10, permitting spring-biased switch contact 69a to disengage from fixed contact 69b, opening the circuit to the drive motor and actuating a conventional power brake (not shown) for the drive motor. Thus, the safety switch 69 provides instant power shut-off when the lid or closure 64 is opened, preventing injury to fingers, etc. of users of the food processor.

Figure 3:
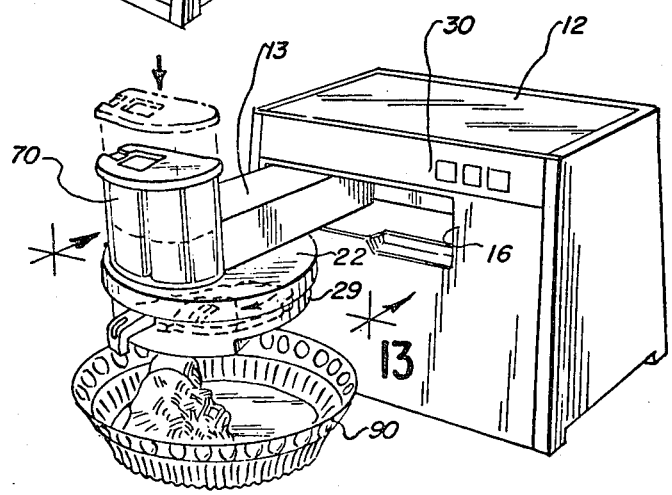
FIG. 3 is a perspective view illustrating the use of the device as a food processor wherein food is delivered through a chute to a cutting blade carried in a housing portion carried on the support arm with the processed food being delivered downwardly therefrom to a subjacent receiving container.

Referring now to FIG. 3, when the cover 22 is installed on the support arm 13, the user's fingers are prevented from passing downwardly through the cover by means of the guide chute 70 upstanding from the cover and defining the entrance passage through the cover. As best seen in FIGS. 1 and 6, the guide chute is provided with a longitudinal divider wall 71 dividing the chute into two different sized passages 72 and 73, respectively. The divider wall 71 is removable. Removing the divider wall provides a larger opening, equal to passages 72 and 73 facilitating processing a relatively large item such as a cucumber or potato. A complementary food pusher (or pressor) 74 (FIGS. 1 and 6) is provided, having a first portion 75 adapted to be received in the smaller passage 72, and a second portion 76 adapted to be received in the larger passage 73 in pushing food downwardly through the chute and cover. As shown in FIGS. 1 and 6, the upper end of the pusher 74 defines a pusher handle 77 for facilitating the pushing action.

Referring now more specifically to FIGS. 1, 3 and 13, when it is desired to utilize apparatus 10 as a food processor, the processor housing 29 is secured to the cover 22 with the processor element 24 installed therein, as shown in FIG. 13. As shown, the processor housing includes a bottom wall 78 defining a well 79 provided with an upstanding central bearing portion 80 receiving a downwardly projecting center post 81 of the disc 25. The top of post 81 is provided with a suitable recess 82 receiving the connector 35 for rotating the processor element in the housing 29 on bearing 80.

As best seen in FIG. 1, disc 25 is provided with a rectangular recess 83 having inwardly opening slots 84 in the side edges thereof for receiving the corresponding side edges 85 of a selected one of the removable cutter blades 26, 27 and 28, respectively. Thus, as illustrated in FIG. 1, any one of the blades may be installed on disc 25 by suitable slidable reception in the slots 84. In the illustrated embodiment, the blades are provided with different cutter configurations so as to provide different processing operations, such as slicing, cutting, shredding, etc.

As shown in FIGS. 1 and 13, processor housing 29 is mounted to the support arm 13 by means of the cover 22. More specifically, the housing 29 is provided with locking tangs 86 corresponding to locking tangs 88 on bowls 18 and 19 which are removably received in the interlock slots 87 of cover 22, as best seen in FIG. 13, in the assembled arrangement of the processor means. As shown in FIG. 13, the cutter blade 26 is received in the space between the housing bottom wall 78 and cover 22. As seen in FIG. 1, the housing is provided with a through opening 89 which is aligned with chute 70 of cover 22 when the cover is so installed on the housing. Thus, food passed downwardly through the chute is caused to engage the cutter blade carried on disc 25 so as to be processed thereby as a result of the rotation of the disc by the drive means through the connector 35. The processed food passes downwardly through the opening 89 and may be collected in a suitable receptacle, such as bowl 90 shown in FIG. 3.

Housing 29 is provided with a manipulating handle 91 further provided with a latch 92 similar to latch 56 of handles 61 and 62. Thus, latch 92 serves to releasably retain the housing 29 in interlocked association with the cover 22 when assembled as shown in FIGS. 3 and 13.

Figure 2:
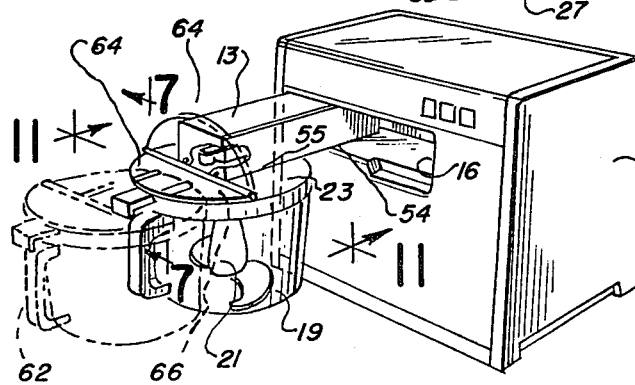
FIG. 2 is a perspective view illustrating the arrangement of the food processor as a blender with the bowl being shown in full lines, and with the bowl also shown spaced from the processor and in broken lines to illustrate the method of mounting the bowl to the support arm.

Thus, the invention comprehends providing the food processing means in housing 29 independently of the collecting receptacle in contradistinction to the arrangement utilizing the bowls 18 and 19 which are supported solely by the cantilevered support arm 13, as illustrated in FIGS. 2 and 8, respectively.

Referring now to FIG. 4, base housing 14 defines an interior storage space 93 adapted to store the selectively mountable devices of the processor system when not in use. As shown in FIG. 4, one end of the housing 14 defines an opening 94 which is selectively closed by an end wall 95 slidably retained on ribs 96 at the top and bottom of the housing. End wall 95 thus functions as a cover. This end wall or cover could also be hinged instead of slidably mounted as shown.

As further illustrated in FIG. 4, a storage rack 97 is mounted to the housing 14 within storage space 93 for storing the cutter blades 26, 27 and 28 for facilitated access. This storage rack is removable by sliding from left to right disengaging from an integral rib structure (not shown) on the interior of housing 14. A horizontal support wall 98 is provided subjacent the top wall 99 of the housing for storing the food processor housing 29. The other devices of the food processing apparatus may be stored in the relatively commodious storage space 93, as illustrated by the shown storage of bowl 19 and cover 22 therein.

The processor system 10, as discussed above, may be utilized as a countertop food processor, blender or mixer apparatus by suitably mounting the desired devices to the support arm 13 extended in the operative position. During the installation of the desired device, the shaft 34 is retracted by suitably manipulating the control knob 38 to the "off" position shown in FIG. 1. When the desired structure is mounted to the support arm 13 by engaging the slide rail 55 with the complementary slots 100 (FIG. 11) of the support arm bottom wall 54 to the fully installed disposition, the shaft 34 is lowered by suitable manipulation of knob 38 so as to frictionally engage and drive the central support of the processor element so installed. Illustratively, as seen in FIG. 11, the engagement of connector 35 with the center post 41 of the blending cutter element 21 now provides a rotative drive thereof upon energization of the drive motor to effect rotation of drive shaft 31 (FIG. 12). Similarly, the engagement of connector 35 with the center post 81 of the cutter disc 25 provides the driving connection to the cutter disc for rotation thereof upon energization of the drive by suitable actuation of the control 30 (FIG. 1).

The various elements may be readily disassociated from the support arm 13 by simply retracting the shaft 34 by returning the control knob to the "off" position and then sliding the cover element from the end of the control arm to disengage the rail means 55. If at any time it is desired to remove the bowl 18, bowl 19, or housing 29 connected to the support arm through the appropriate cover, this may be readily effected by suitable manipulation of the latch 92 and rotation of the supported element relative to the cover to disengage the tangs 86 or 88 from the interlocking slots of the cover, thereby permitting the element to be withdrawn downwardly from the support arm leving the cover in place thereon.

It should be noted that in each instance, the rotating processing element is journaled on a pivot bearing carried by the bottom wall of the receptacle in which it is mounted, the receptacle comprising either bowl 18 or 19, or the housing 29, as discussed above.

Figure 14:
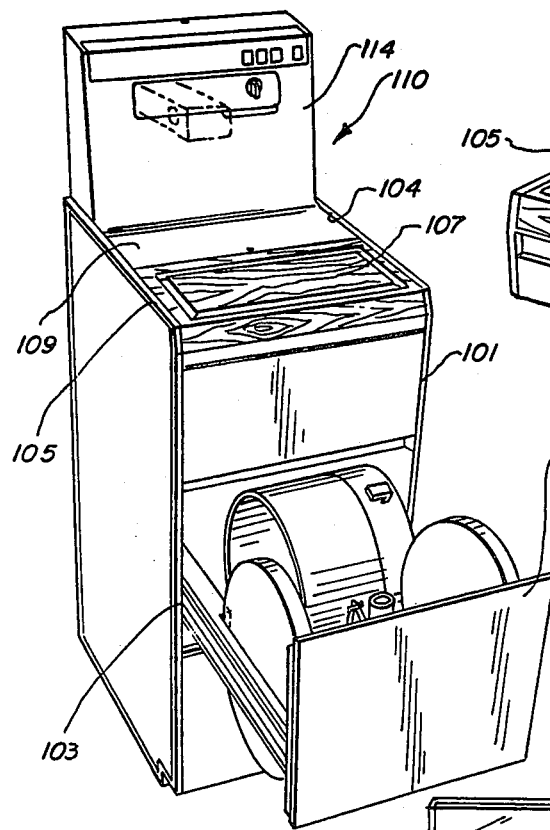
FIG. 14 is a perspective view of a modified form of food processor embodying the invention provided in a freestanding cabinet.
Figure 15:
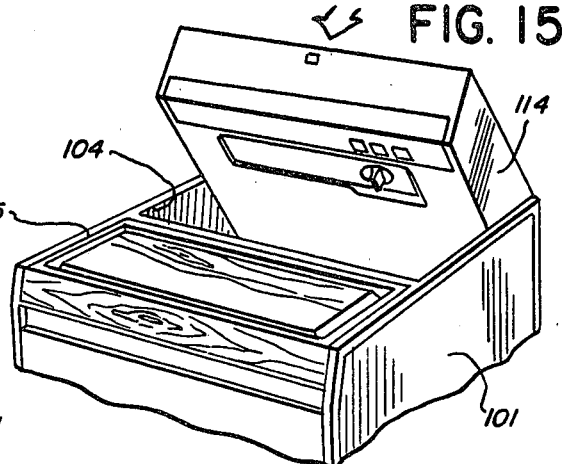
FIG. 15 is a fragmentary perspective view illustrating the movement of the processor from the operative position of FIG. 14 to a recessed position within the cabinet.
Figure 16:
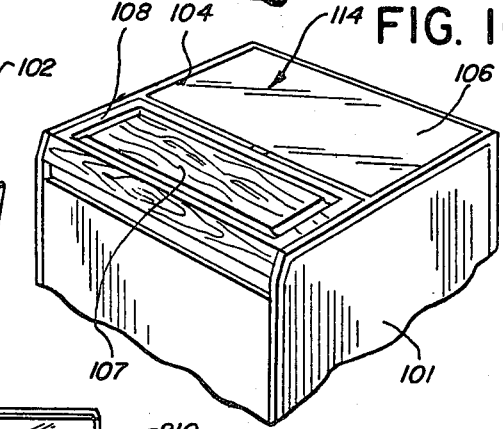
FIG. 16 is a perspective view illustrating the arrangement of the food processor in the recessed position in the cabinet.

Referring now to FIGS. 14–16, a modified form of processor system generally designated 110 is shown to comprise a food processor generally similar to food processor 10 but arranged as a freestanding, floor-mounted processor in a floor cabinet 101. As seen in FIG. 14, the base housing 114 is somewhat narrower than the base housing 12 of food processor 10 inasmuch as the removable elements of the system are stored in a suitable drawer 102 carried by the cabinet 101 rather than in the base housing 114. As shown in FIG. 14, the drawer may be mounted on suitable rails 103 for facilitated selective disposition in an accessible arrangement, as shown in FIG. 14, and in a closed position wherein the drawer is fully inserted in the cabinet 101.

As best seen in FIG. 15, the cabinet defines an opening 104 in the top wall 105 thereof. Housing 114 is pivotally mounted to the cabinet so as to swing between an operative, upstanding arrangement, as seen in FIG. 14, and a retracted, storage position, as seen in FIG. 16. The rear wall 106 of the housing extends substantially flush with the top wall 105 so as to define a countertop surface in the retracted arrangement of the food processor.

As further shown, the front portion of the top wall 105 may be defined by a cutting board 107 which may be removably received in a recess 108 in the top wall. As shown in FIG. 14, the cutting board may be utilized in conjunction with the food processor in defining a surface forwardly thereof during normal food processing operations.

As further shown in FIG. 14, housing 114 includes a turned bottom wall portion 109 which extends substantially flush with top wall 105 in the operative arrangement of the food processor so as to define means cooperating with cutting board 107 for supporting a bowl or the like subjacent the food processor means.

Thus, floor-mounted processing apparatus 110 is similar to countertop food processing apparatus 10 and functions in a similar manner except for the distinctions discussed above.

Figure 17:
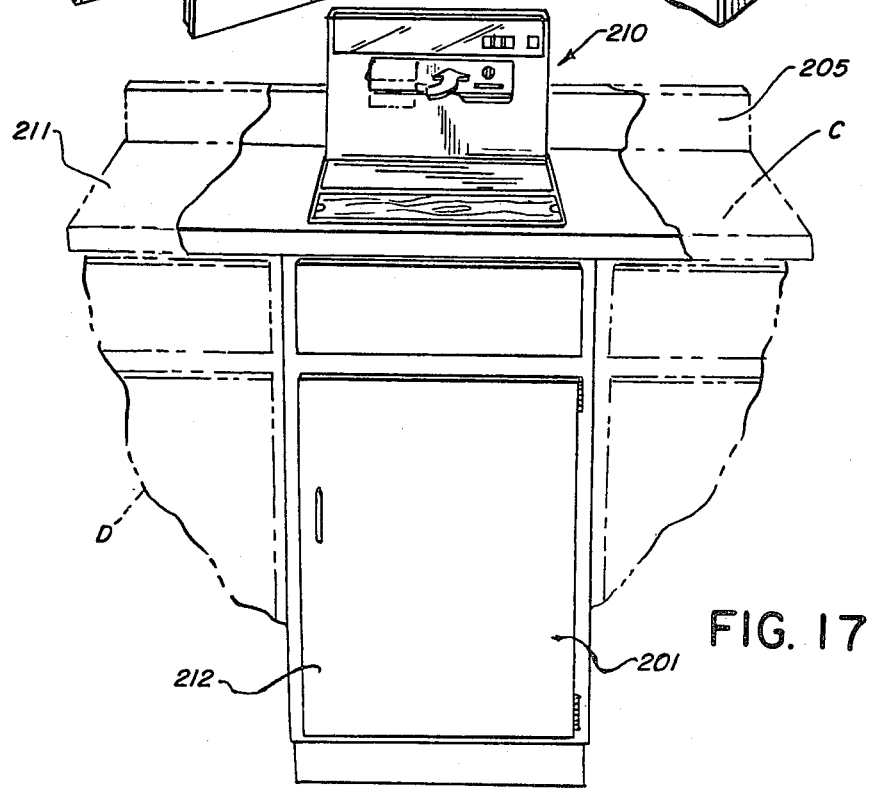
FIG. 17 is a fragmentary perspective view illustrating another form of food processor embodying the invention similar to that of FIG. 14 but wherein the cabinet comprises a portion of a counter.
Figure 18:
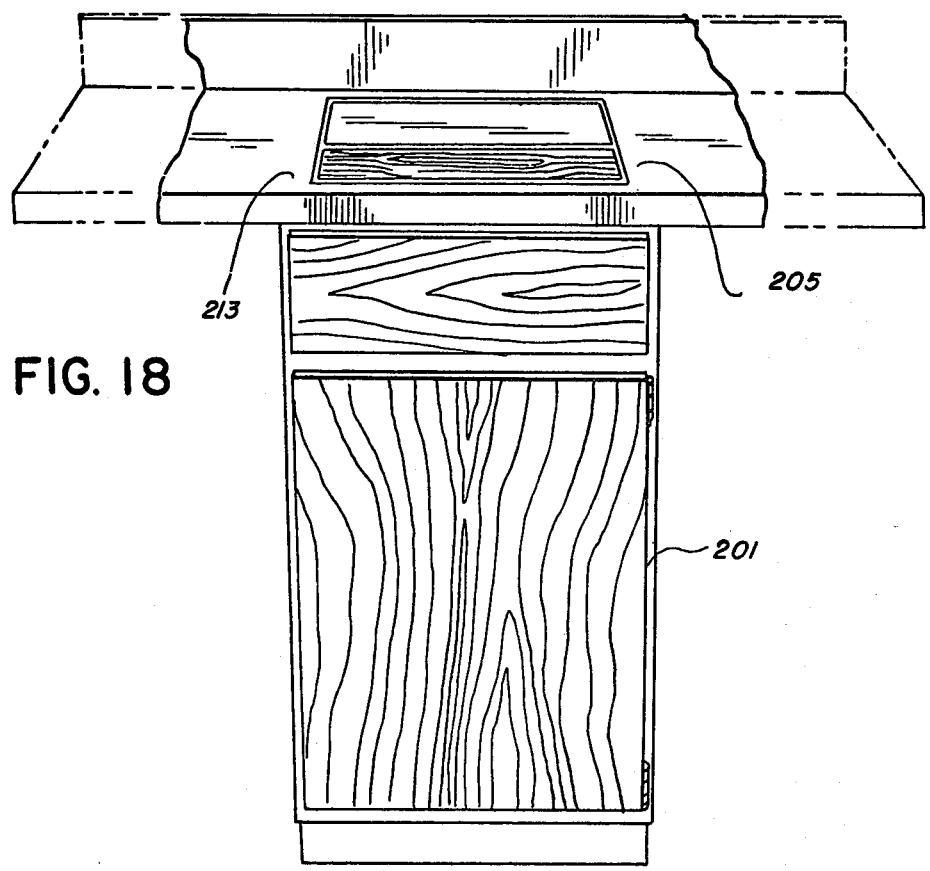
FIG. 18 is a perspective view thereof with the food processor in the retracted position.

Referring now to FIGS. 17 and 18, a food processing apparatus generally designated 210 is shown to comprise an apparatus generally similar to apparatus 110, but forming a portion of a conventional kitchen counter C, or the like, having a countertop 211 and which may include a back splash 205. As shown in FIGS. 17 and 18, counter C may be provided with front cabinet doors such as a front cabinet door 212. The countertop 211 is provided with a suitable opening and then the apparatus 210 can be dropped into place to provide a "built-in" configuration.

The food processor is selectively positionable in the operative position of FIG. 17 and the retracted position of FIG. 18 by swinging the food processor selectively between the upright position of FIG. 17 and the retracted position of FIG. 18 within the cabinet 201. Thus, the food processor 210 is similar to the food processor 110 except for the modifications of the cabinet as discussed above.

Thus, in each of the different embodiments, the processing apparatus may be utilized as a blender or mixer with suitable associated bowl means, or as a continuous flow food processor, permitting the processed food to be received in a subjacently supported receptacle. The mounting of the different elements to the support arm may be readily effected by the simple yet positive slide rail means. Different size bowls may be utilized with the different covers, as desired. Illustratively, a small bowl 19 may be utilized having a 2⅓-quart capacity and a larger bowl 18 may be utilized having a larger capacity, such as 3⅓ quarts, or any other desired capacity. With the present invention, wherein the rotatable cutting and mixing elements are driven from the support arm above the bowl, the bowl employed with the processor may be utilized to its full liquid capacity. This is in contrast to a conventional processor wherein the bowl has a bottom opening and the liquid level extends only to a hub around the opening.

In each of the illustrated embodiments of the present invention, the processing elements are supported at their lower ends on bearing pivots, with the drive connection between the elements and the power drive being selectively engaged by a control knob on the support arm itself.

The facilitated installation and removal of the various elements permits facilitated cleaning while at the same time providing maximum capacity in the different food processing operations.

Suitable interlock means may be provided in the processor so as to prevent operation of the drive motor without the cover fully installed in place on the support arm, or when the support arm is retracted into the base housing. Additionally, as discussed above, when the hinged lid cover 23 is utilized, the safety switch 69 prevents operation of the drive when the lid is brought to the open position of FIG. 2.

As shown in FIG. 6, the pusher portion 76 may be provided with suitable indicia 115, to permit the use of the pusher portion 76 as a measuring cup, the handle portion 77 thereof being provided with a suitable opening 116, as shown in FIG. 1, substantially congruent with the pusher portion 76.

While the invention has been disclosed with three cutter blades 26, 27 and 28, it is obvious that any suitable additional cutter blades may be utilized interchangeably therewith on disc 25.

Similarly, where it is desired to use the cutter element 21 in conjunction with the large bowl 18, a suitable extension adapter 117 (upper right side, FIG. 1) may be provided for engagement with the recess 47 of the cutter 21 at its lower end, and with the connector element 35 of the drive means at its upper end.

As will be obvious to those skilled in the art, the support arm may comprise an arm fixedly extended from the base support, as desired. Similarly, other suitable means for releasably locking the elements in operative position may be utilized within the scope of the invention.

The foregoing disclosure of specific embodiments is illustrative of the broad inventive concepts comprehended by the invention.

We claim:

1. A multipurpose culinary food processor comprising:
   a housing defining an outwardly opening recess;
   a drive mechanism;
   an enclosure having a bottom and a side wall;
   means on the drive mechanism for removably suspending the enclosure from the drive mechanism;
   food processing means including food cutting blades;
   means for supporting the food processing means on the bottom of the enclosure;
   connecting means for removably driving the processing means from the drive mechanism; and
   means for selectively positioning the drive mechanism and said enclosure suspending means in a retracted inoperative disposition within said recess separately of said processing means with said enclosure and food processing means removed therefrom, and in an operative disposition extending from said housing with said enclosure and food processing means removably installed thereon.

2. The multipurpose culinary food processor of claim 1 wherein said drive mechanism includes a wall portion which is substantially flush with the housing when the drive mechanism is in said retracted disposition.

3. A multipurpose culinary food processor comprising:
   a housing;
   a drive mechanism;
   an enclosure having a bottom and a side wall;
   means on the drive mechanism for removably suspending the enclosure from the drive mechanism;
   food processing means including food cutting blades;
   means for supporting the food processing means on the bottom of the enclosure connecting means for removably driving the processing means from the drive mechanism; and means for selectively positioning the drive mechanism with said enclosure suspending means in a retracted inoperative disposition separately of said processing means with said enclosure and food processing means removed therefrom, and in an operative disposition extending from said housing with said enclosure and food processing means removably installed thereon, said positioning means comprising means for mounting the drive mechanism to swing about a vertical axis between said retracted and operative dispositions.

4. The multipurpose culinary food processor of claim 3 wherein said housing defines a base portion arranged to rest on a supporting horizontal support surface, and an upper portion spaced above said base portion, said drive mechanism being cantilevered from said upper portion in said operative disposition.

5. The multipurpose culinary food processor of claim 3 wherein said housing defines a base portion arranged to rest on a supporting horizontal support surface, and an upper portion spaced above said base portion, said drive mechanism being cantilevered from said upper portion in said operative disposition, the space below said enclosure when said enclosure is suspended from said drive mechanism being disposed laterally of said housing.

* * * * *